US011629660B2

United States Patent
Nose et al.

(10) Patent No.: US 11,629,660 B2
(45) Date of Patent: Apr. 18, 2023

(54) CONTROL APPARATUS FOR INTERNAL COMBUSTION ENGINE

(71) Applicant: TOYOTA JIDOSHA KABUSHIKI KAISHA, Aichi-ken (JP)

(72) Inventors: Yuki Nose, Nagoya (JP); Yuto Ikeda, Okazaki (JP); Takanobu Gotoh, Obu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/713,241

(22) Filed: Apr. 5, 2022

(65) Prior Publication Data

US 2022/0333543 A1 Oct. 20, 2022

(30) Foreign Application Priority Data

Apr. 20, 2021 (JP) .............................. JP2021-070951

(51) Int. Cl.
*F02D 41/12* (2006.01)
*F02D 41/02* (2006.01)

(52) U.S. Cl.
CPC ......... *F02D 41/123* (2013.01); *F02D 41/029* (2013.01); *F02D 2200/0804* (2013.01); *F02D 2200/0812* (2013.01)

(58) Field of Classification Search
CPC .... F02D 41/126; F02D 41/123; F02D 41/029; F02D 41/0087; F02D 41/18; F02D 2200/0804; F02D 2200/0812; F02D 2009/0245; F01N 3/023; Y02T 10/40
See application file for complete search history.

(56) References Cited

U.S. PATENT DOCUMENTS

| 5,784,880 A | * | 7/1998 | Toshiro | ................. | F02D 41/123 60/285 |
| 2007/0033926 A1 | * | 2/2007 | Takubo | .................... | F01N 9/00 60/276 |
| 2009/0308055 A1 | * | 12/2009 | Suzuki | ................... | B60K 6/448 60/299 |
| 2020/0025118 A1 | | 1/2020 | Kurita et al. | | |
| 2020/0291887 A1 | * | 9/2020 | Nishi | ..................... | F02D 41/126 |

FOREIGN PATENT DOCUMENTS

| JP | 2019-190358 A | 10/2019 |
| JP | 2020-12404 A | 1/2020 |

\* cited by examiner

*Primary Examiner* — George C Jin
(74) *Attorney, Agent, or Firm* — Hauptman Ham, LLP

(57) ABSTRACT

A control apparatus for an internal combustion engine performs a first acquisition process for acquiring a first index value corresponding to an integrated amount of intake air during a performance of the fuel cutoff process, and a cancellation process for cancelling the fuel cutoff process when the first index value becomes equal to or larger than a first predetermined value during the performance of the fuel cutoff process. Besides, the control apparatus performs a second acquisition process for acquiring a second index value corresponding to an elapsed time from the end of the fuel cutoff process to the subsequent start of the fuel cutoff process, and a change process for making the first predetermined value smaller when the second index value is small in starting the fuel cutoff process than when the second index value is large in starting the fuel cutoff process.

8 Claims, 6 Drawing Sheets

CONTROL APPARATUS FOR INTERNAL COMBUSTION ENGINE

CROSS-REFERENCE TO RELATED APPLICATION

This application claims priority to Japanese Patent Application No. 2021-070951 filed on Apr. 20, 2021, incorporated herein by reference in its entirety.

BACKGROUND

1. Technical Field

The present disclosure relates to a control apparatus for an internal combustion engine.

2. Description of Related Art

An internal combustion engine of Japanese Unexamined Patent Application Publication No. 2019-190358 (JP 2019-190358 A) is equipped with a cylinder, a fuel injection valve, an exhaust passage, and a filter. The cylinder is a space for burning fuel. The fuel injection valve injects fuel into the cylinder. The exhaust passage is connected to the cylinder. The filter is located in the exhaust passage. The filter collects particulate matter contained in exhaust gas.

A control apparatus that controls the internal combustion engine of JP 2019-190358 A performs a fuel cutoff process for stopping the injection of fuel from the fuel injection valve when a fuel cutoff condition determined in advance is fulfilled. The intake air that has not been burned, namely, the air containing oxygen is supplied to the filter from the cylinder through this fuel cutoff process. When oxygen is thus supplied to the filter, the filter is regenerated through combustion of the particulate matter deposited in the filter. Besides, the control apparatus of JP 2019-190358 A cancels the fuel cutoff process when the integrated amount of intake air becomes equal to or larger than a predetermined value determined in advance, during the performance of the fuel cutoff process. The filter is restrained from being overheated through combustion of a large amount of particulate matter, by cancelling the fuel cutoff process in this manner.

SUMMARY

Even in the case where the fuel cutoff process is cancelled through the process of cancellation, the control apparatus of JP 2019-190358 A performs the fuel cutoff process again if the fuel cutoff condition is fulfilled immediately thereafter. In this case, if the oxygen supplied through the last fuel cutoff process remains in the filter, the filter may be overheated even when the integrated amount of intake air is smaller than the predetermined value, in the fuel cutoff process performed again.

A control apparatus for an internal combustion engine for solving the above-mentioned problem is a control apparatus that is applied to an internal combustion engine equipped with a cylinder for burning fuel, a fuel injection valve for supplying fuel into the cylinder, an exhaust passage connected to the cylinder, and a filter located in the exhaust passage to collect particulate matter contained in exhaust gas. The control apparatus performs a fuel cutoff process for stopping supply of fuel to the cylinder from the fuel injection valve when a fuel cutoff condition determined in advance is fulfilled, a first acquisition process for acquiring a first index value that increases as an integrated amount of intake air during the performance of the fuel cutoff process increases, a cancellation process for cancelling the fuel cutoff process when the first index value becomes equal to or larger than a first predetermined value determined in advance, during the performance of the fuel cutoff process, a second acquisition process for acquiring a second index value that increases as an elapsed time from the end of the fuel cutoff process to the subsequent start of the fuel cutoff process lengthens, and a change process for making the first predetermined value smaller when the second index value is small in starting the fuel cutoff process than when the second index value is large in starting the fuel cutoff process.

In the aforementioned configuration, when the second index value is small, the possibility of the oxygen supplied through the last fuel cutoff process remaining in the filter is high. According to the aforementioned configuration, in this case, the current fuel cutoff process is cancelled at an early stage due to a decrease in the first predetermined value. Accordingly, the filter can be restrained from being overheated, even when the fuel cutoff process is started before the lapse of a sufficient time from the end of the last fuel cutoff process.

In the aforementioned configuration, the control apparatus may make the first predetermined value smaller in the subsequent fuel cutoff process when the first index value acquired upon the end of the fuel cutoff process is large than when the first index value is small, in the change process.

In the aforementioned configuration, the possibility of the oxygen supplied through the last fuel cutoff process remaining in the filter rises as the first index value upon the end of the last fuel cutoff process increases. According to the aforementioned configuration, the first predetermined value in the current fuel cutoff process can be adjusted in accordance with the first index value upon the end of the last fuel cutoff process. Thus, the fuel cutoff process can be cancelled at a more appropriate timing.

In the aforementioned configuration, the control apparatus may determine whether or not the second index value is smaller than a second predetermined value determined in advance in starting the fuel cutoff process, make the first predetermined value smaller when it is determined that the second index value is smaller than the second predetermined value than when the second index value is equal to or larger than the second predetermined value, and make the second predetermined value larger in the subsequent fuel cutoff process when the first index value acquired upon the end of the fuel cutoff process is large than when the first index value is small, in the change process.

According to the aforementioned configuration, the second predetermined value in the current fuel cutoff process can be adjusted in accordance with the first index value upon the end of the last fuel cutoff process. Thus, it can be determined whether or not the first predetermined value should be reduced, in accordance with the amount of oxygen remaining in the last fuel cutoff process.

In the aforementioned configuration, the internal combustion engine may be equipped with a plurality of cylinders identical to the cylinder, and a plurality of fuel injection valves identical to the fuel injection valve and provided for the cylinders respectively. The fuel cutoff process may include a specific cylinder fuel cutoff process for stopping the supply of fuel to one or some of the cylinders while supplying fuel to the other cylinders or the other cylinder, and an all-cylinder fuel cutoff process for stopping the supply of fuel to all of the cylinders. The control apparatus may make the first predetermined value smaller when the last fuel cutoff process is the all-cylinder fuel cutoff process than when the last fuel cutoff process is the specific cylinder fuel cutoff process, in the change process.

In the aforementioned configuration, a larger amount of oxygen can be supplied to the filter in the case of the all-cylinder fuel cutoff process than in the case of the specific cylinder fuel cutoff process. Accordingly, the amount of oxygen remaining in the filter after the end of the fuel cutoff process is also likely to be larger in the case of the all-cylinder fuel cutoff process. According to the aforementioned configuration, the first predetermined value is adjusted taking into account that a large amount of oxygen remains in the filter after the end of the all-cylinder fuel cutoff process. Thus, the timing for cancelling the fuel cutoff process can be adjusted appropriately.

In the aforementioned configuration, the internal combustion engine may be equipped with a plurality of cylinders identical to the cylinder, and a plurality of fuel injection valves identical to the fuel injection valve and provided for the cylinders respectively. The fuel cutoff process may include a specific cylinder fuel cutoff process for stopping the supply of fuel to one or some of the cylinders while supplying fuel to the other cylinders or the other cylinder, and an all-cylinder fuel cutoff process for stopping the supply of fuel to all of the cylinders. The control apparatus may determine whether or not the second index value is smaller than a second predetermined value determined in advance in starting the fuel cutoff process, make the first predetermined value smaller when it is determined that the second index value is smaller than the second predetermined value than when the second index value is equal to or larger than the second predetermined value, and make the second predetermined value larger when the last fuel cutoff process is the all-cylinder fuel cutoff process than when the last fuel cutoff process is the specific cylinder fuel cutoff process, in the change process.

In the aforementioned configuration, a larger amount of oxygen can be supplied to the filter in the case of the all-cylinder fuel cutoff process than in the case of the specific cylinder fuel cutoff process. Accordingly, the amount of oxygen remaining in the filter after the end of the fuel cutoff process is also likely to be larger than in the case of the all-cylinder fuel cutoff process. According to the aforementioned configuration, the second predetermined value is adjusted taking into account that a large amount of oxygen remains in the filter after the end of the all-cylinder fuel cutoff process. Thus, the period in which the process of reducing the first predetermined value should be performed can be adjusted appropriately.

In the aforementioned configuration, the second index value may be an integrated value of an amount of intake air from the end of the fuel cutoff process to the subsequent start of the fuel cutoff process. In the internal combustion engine, even when the time from the end of the last fuel cutoff process to the subsequent resumption of the fuel cutoff process remains the same, the amount of oxygen remaining in the filter changes in accordance with the operating state of the internal combustion engine. In concrete terms, the amount of oxygen remaining in the filter tends to decrease, for example, as the amount of exhaust gas flowing through the interior of the exhaust passage after the fuel cutoff process increases. According to the aforementioned configuration, the amount of oxygen present in the filter in performing the current fuel cutoff process can be more appropriately reflected, through the use of the second index value corresponding to the operating state of the internal combustion engine.

In the aforementioned configuration, the control apparatus may use the first predetermined value that remains unchanged regardless of the second index value, when the last fuel cutoff process is ended due to non-fulfillment of the fuel cutoff condition.

In the aforementioned configuration, when the last fuel cutoff process is cancelled due to non-fulfillment of the fuel cutoff condition, the amount of oxygen remaining in the filter after the end of the last fuel cutoff process is likely to be small. According to the aforementioned configuration, when the amount of oxygen remaining in the filter is thus likely to be small, the first predetermined value is not reduced. Accordingly, the circumstances where the fuel cutoff process is cancelled at an early stage despite a small amount of oxygen remaining in the filter are unlikely to occur.

A control apparatus for an internal combustion engine for solving the above-mentioned problem is a control apparatus that is applied to an internal combustion engine equipped with a cylinder for burning fuel, a fuel injection valve for supplying fuel into the cylinder, an exhaust passage connected to the cylinder, and a filter located in the exhaust passage to collect particulate matter contained in exhaust gas. The control apparatus performs a fuel cutoff process for stopping the supply of fuel to the cylinder from the fuel injection valve when a fuel cutoff condition determined in advance is fulfilled, a first acquisition process for acquiring a first index value that increases as an integrated amount of intake air during the performance of the fuel cutoff process increases, a cancellation process for cancelling the fuel cutoff process when the first index value becomes equal to or larger than a first predetermined value determined in advance, during the performance of the fuel cutoff process, and a second acquisition process for acquiring a second index value that increases as an elapsed time from the end of the fuel cutoff process to the subsequent start of the fuel cutoff process lengthens. The control apparatus makes a speed of increase in the first index value with respect to the integrated amount of intake air higher when the second index value is small in starting the fuel cutoff process than when the second index value is large in starting the fuel cutoff process, in the first acquisition process.

In the aforementioned configuration, when the second index value is small, the possibility of the oxygen supplied through the last fuel cutoff process remaining in the filter is high. According to the aforementioned configuration, in this case, the current fuel cutoff process is cancelled at an early stage due to a rise in the speed of increase in the first index value. Accordingly, even when the fuel cutoff process is started before the lapse of a sufficient time from the end of the last fuel cutoff process, the filter can be restrained from being overheated.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS (Schematic Configuration of Vehicle)

One of the embodiments of the present disclosure will be described hereinafter with reference to FIGS. 1 to 4. First of all, the schematic configuration of a vehicle 100 will be described.

Figure 1:
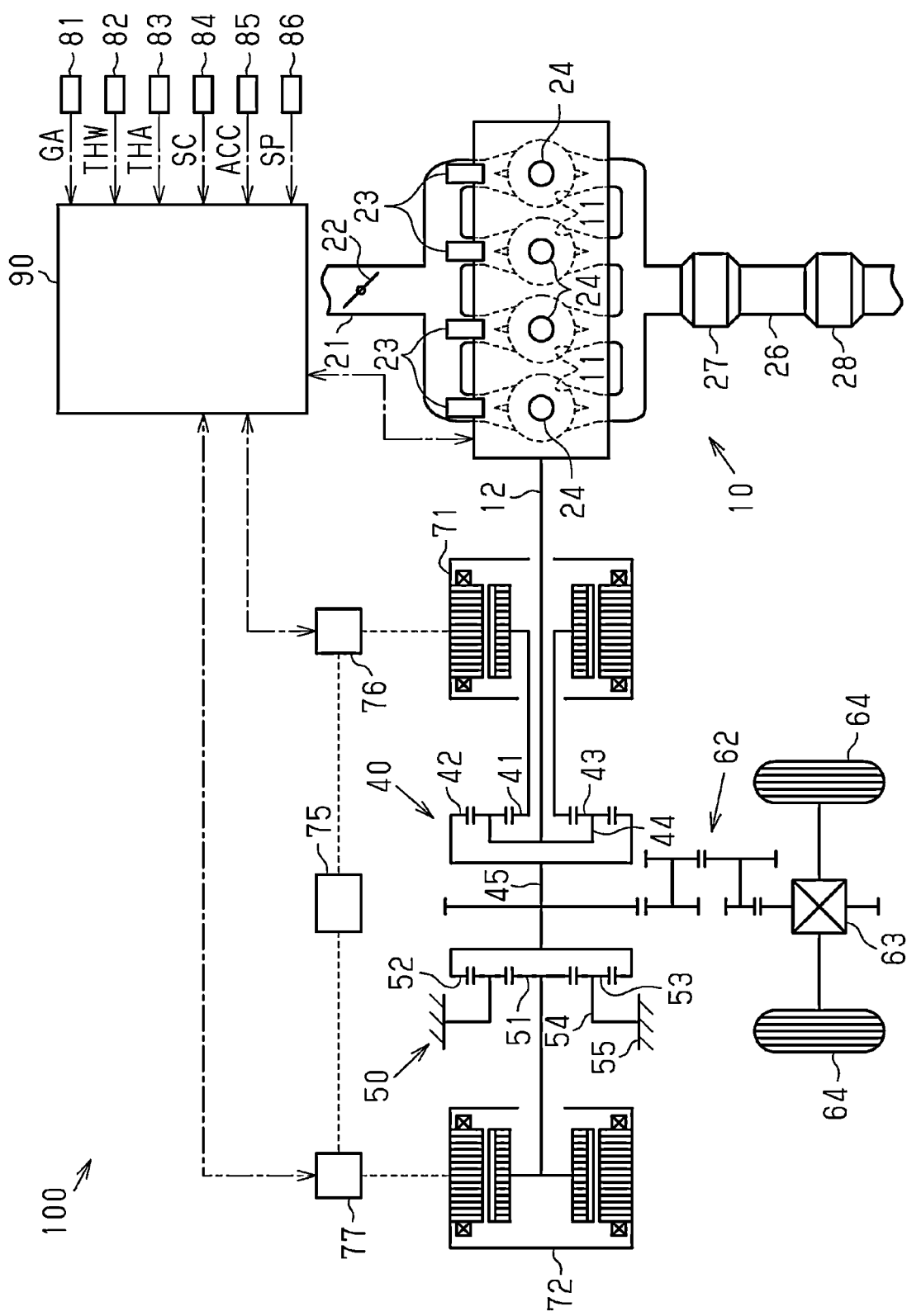
FIG. 1 is a schematic configuration view of a vehicle.

As shown in FIG. 1, the vehicle 100 is equipped with a spark ignition-type internal combustion engine 10. The vehicle 100 is equipped with a first motor-generator 71 and a second motor-generator 72 that function as both an electric motor and an electric power generator. Accordingly, the vehicle 100 is a so-called hybrid electric vehicle.

The internal combustion engine 10 is equipped with a plurality of cylinders 11, a crankshaft 12, an intake passage 21, a throttle valve 22, a plurality of fuel injection valves 23, a plurality of ignition devices 24, an exhaust passage 26, a three-way catalyst 27, and a filter 28.

In the cylinders 11, a mixture of fuel and intake air burns. The internal combustion engine 10 is equipped with the four cylinders 11. The intake passage 21 is connected to the cylinders 11. A region of the intake passage 21 including a downstream end thereof branches off into four passages. These passages are connected to the cylinders 11 respectively. The intake passage 21 introduces intake air into the cylinders 11 from an outside of the internal combustion engine 10. The throttle valve 22 is located upstream as viewed from the branching region of the intake passage 21. The throttle valve 22 adjusts the amount of intake air flowing through the intake passage 21.

The fuel injection valves 23 are located in the vicinity of the downstream end of the intake passage 21. The internal combustion engine 10 is equipped with the fuel injection valves 23 for the cylinders 11 respectively. That is, the internal combustion engine 10 is equipped with the four fuel injection valves 23 corresponding to the four cylinders 11 respectively. The fuel injection valves 23 inject the fuel supplied from a fuel tank (not shown) into the intake passage 21. The ignition devices 24 are located in the cylinders 11 respectively. The internal combustion engine 10 is equipped with the four ignition devices 24 corresponding to the four cylinders 11 respectively. The ignition devices 24 ignite the mixture of fuel and intake air through spark discharge.

The exhaust passage 26 is connected to the cylinders 11. A region of the exhaust passage 26 including an upstream end thereof branches off into four passages. These passages are connected to the cylinders 11 respectively. The exhaust passage 26 discharges exhaust gas to the outside of the internal combustion engine 10 from the respective cylinders 11.

The three-way catalyst 27 is located downstream as viewed from the branching region of the exhaust passage 26. The three-way catalyst 27 controls the emission of exhaust gas flowing through the exhaust passage 26. The filter 28 is located downstream as viewed from the three-way catalyst 27 in the exhaust passage 26. The filter 28 collects the particulate matter contained in exhaust gas flowing through the exhaust passage 26.

The crankshaft 12 is coupled to pistons (not shown) located in the cylinders 11 respectively. The crankshaft 12 rotates through the combustion of the mixture of fuel and intake air in the cylinders 11.

The vehicle 100 is equipped with a first planetary gear mechanism 40, a ring gear shaft 45, a second planetary gear mechanism 50, a deceleration mechanism 62, a differential mechanism 63, and a plurality of driving wheels 64. The first planetary gear mechanism 40 is equipped with a sun gear 41, a ring gear 42, a plurality of pinion gears 43, and a carrier 44. The sun gear 41 is an external gear. The sun gear 41 is connected to the first motor-generator 71. The ring gear 42 is an internal gear, and is located coaxially with the sun gear 41. Each of the pinion gears 43 is located between the sun gear 41 and the ring gear 42. Each of the pinion gears 43 meshes with both the sun gear 41 and the ring gear 42. The carrier 44 supports the pinion gears 43. Each of the pinion gears 43 can rotate around an axis thereof, and can revolve around the crankshaft 12 by rotating together with the carrier 44. The carrier 44 is connected to the crankshaft 12.

The ring gear shaft 45 is connected to the ring gear 42. Besides, the ring gear shaft 45 is connected to the driving wheels 64 via the deceleration mechanism 62 and the differential mechanism 63. The deceleration mechanism 62 reduces a rotational speed of the ring gear shaft 45 and outputs the reduced rotational speed. The differential mechanism 63 allows a difference in rotational speed to be created between the right and left driving wheels 64.

The second planetary gear mechanism 50 is equipped with a sun gear 51, a ring gear 52, a plurality of pinion gears 53, a carrier 54, and a case 55. The sun gear 51 is an external gear. The sun gear 51 is connected to the second motor-generator 72. The ring gear 52 is an internal gear, and is located coaxially with the sun gear 51. The ring gear 52 is connected to the ring gear shaft 45. Each of the pinion gears 53 is located between the sun gear 51 and the ring gear 52. Each of the pinion gears 53 meshes with both the sun gear 51 and the ring gear 52. The carrier 54 supports the pinion gears 53. Each of the pinion gears 53 can rotate around an axis thereof. The carrier 54 is fixed to the case 55. Accordingly, the pinion gears 53 cannot revolve around the crankshaft 12.

The vehicle 100 is equipped with a battery 75, a first inverter 76, and a second inverter 77.

The first inverter 76 carries out conversion between AC electric power and DC electric power, between the first motor-generator 71 and the battery 75. Besides, the first inverter 76 adjusts the amount of electric power given and received between the first motor-generator 71 and the battery 75. The second inverter 77 carries out conversion between AC electric power and DC electric power, between the second motor-generator 72 and the battery 75. The second inverter 77 adjusts the amount of electric power given and received between the second motor-generator 72 and the battery 75.

The vehicle 100 is equipped with an airflow meter 81, a coolant temperature sensor 82, an intake air temperature sensor 83, a crank angle sensor 84, an accelerator operation amount sensor 85, and a vehicle speed sensor 86.

The airflow meter 81 is located upstream as viewed from the throttle valve 22 in the intake passage 21. The airflow meter 81 detects an intake air amount GA that is an amount of intake air flowing through the interior of the intake passage 21 per unit time. The coolant temperature sensor 82 detects a coolant temperature THW that is a temperature of coolant flowing through various portions of the internal combustion engine 10. The intake air temperature sensor 83 detects an intake air temperature THA that is a temperature of intake air flowing through the intake passage 21. The crank angle sensor 84 detects a crank angle SC that is a rotational angle of the crankshaft 12. The accelerator operation amount sensor 85 detects an accelerator operation amount ACC that is an operation amount of an accelerator pedal operated by a driver. The vehicle speed sensor 86 detects a vehicle speed SP that is a speed of the vehicle 100.

The vehicle 100 is equipped with a control apparatus 90. The control apparatus 90 acquires a signal indicating the intake air amount GA from the airflow meter 81. The control apparatus 90 acquires a signal indicating the coolant temperature THW from the coolant temperature sensor 82. The control apparatus 90 acquires a signal indicating the intake air temperature THA from the intake air temperature sensor 83. The control apparatus 90 acquires a signal indicating the crank angle SC from the crank angle sensor 84. The control apparatus 90 acquires a signal indicating the accelerator operation amount ACC from the accelerator operation amount sensor 85. The control apparatus 90 acquires a signal indicating the vehicle speed SP from the vehicle speed sensor 86.

The control apparatus 90 calculates a vehicle required output that is a required value of an output that is needed for the running of the vehicle 100, based on the accelerator operation amount ACC and the vehicle speed SP. The control apparatus 90 decides a distribution of torque to the internal combustion engine 10, the first motor-generator 71, and the second motor-generator 72, based on the vehicle required output. The control apparatus 90 controls the output of the internal combustion engine 10, and the power running and regeneration of the first motor-generator 71 and the second motor-generator 72, based on the distribution of torque to the internal combustion engine 10, the first motor-generator 71, and the second motor-generator 72. In concrete terms, the control apparatus 90 controls the opening degree of the throttle valve 22, the amounts of fuel injection from the fuel injection valves 23, the ignition timings of the ignition devices 24, and the like, by outputting control signals to the internal combustion engine 10. Besides, the control apparatus 90 controls the first motor-generator 71 via the first inverter 76 by outputting a control signal to the first inverter 76. Furthermore, the control apparatus 90 controls the second motor-generator 72 via the second inverter 77 by outputting a control signal to the second inverter 77.

The control apparatus 90 calculates an engine rotational speed NE that is the number of revolutions of the crankshaft 12 per unit time, based on the crank angle SC. The control apparatus 90 calculates an engine load factor KL, based on the engine rotational speed NE and the intake air amount GA. It should be noted herein that the engine load factor KL represents a ratio of a current cylinder inflow air amount to a cylinder inflow air amount at the time of steady operation of the internal combustion engine 10 with the throttle valve 22 fully open at the current engine rotational speed NE. Incidentally, the cylinder inflow air amount is an amount of intake air flowing into each of the cylinders 11 in an intake stroke.

The control apparatus 90 calculates a catalyst temperature TSC that is a temperature of the three-way catalyst 27, based on an operating state of the internal combustion engine 10 such as a filling efficiency of intake air, the engine rotational speed NE, or the like. Incidentally, the filling efficiency of intake air is a value obtained by dividing a mass of intake air actually introduced into the cylinders 11 from the intake passage 21 by a mass of intake air that can be introduced into the cylinders 11 in a standard atmospheric state. Besides, the control apparatus 90 calculates a filter temperature TF that is a temperature of the filter 28, based on the operating state of the internal combustion engine 10 such as the filling efficiency of intake air, the engine rotational speed NE, or the like. The control apparatus 90 calculates a PM deposition amount PS that is a deposition amount of particulate matter in the filter 28, based on the engine rotational speed NE, the engine load factor KL, and the filter temperature TF.

The control apparatus 90 performs a fuel cutoff process for stopping the supply of fuel to the cylinders 11 from the fuel injection valves 23 respectively, with a view to restraining the filter 28 from being clogged with particulate matter. When this fuel cutoff process is performed, the air containing oxygen is supplied from the cylinders 11 to the filter 28. As a result, the filter 28 is regenerated through the combustion of the particulate matter deposited in the filter 28.

In the present embodiment, there are two types of the fuel cutoff process. The first fuel cutoff process is an all-cylinder fuel cutoff process for stopping the supply of fuel to all of the four cylinders 11. Incidentally, as will be described later, the all-cylinder fuel cutoff process can be subdivided into an all-cylinder fuel cutoff process with restrictions and an all-cylinder fuel cutoff process without restrictions.

The second fuel cutoff process is a single-cylinder fuel cutoff process for stopping the supply of fuel to one of the four cylinders 11 while supplying fuel to the other three cylinders 11. Incidentally, in the single-cylinder fuel cutoff process, fuel is supplied from the fuel injection valves 23 such that the air-fuel ratio of the air-fuel mixture becomes richer than a theoretical air-fuel ratio in the three cylinders 11 to which fuel is supplied. Incidentally, the single-cylinder fuel cutoff process is an example of the specific cylinder fuel cutoff process.

Incidentally, the control apparatus 90 can be configured as a circuitry including at least one processor that performs various processes according to a computer program (software). Incidentally, the control apparatus 90 may also be configured as at least one dedicated hardware circuitry such as an integrated circuitry (ASIC) for specific purposes for performing at least one or some of the various processes, or a circuitry including a combination of at least one processor and at least one dedicated hardware circuitry. The processor includes a CPU and memories such as a RAM and a ROM. The memory stores a program code or command configured to cause the CPU to perform the processes. The memories, namely, computer-readable media include all media that can be accessed by a general-purpose or dedicated computer.

(Changeover Control)

Next, changeover control performed by the control apparatus 90 will be described. The control apparatus 90 makes a changeover between the performance and non-performance of the fuel cutoff process and between the types of the fuel cutoff process to be performed, through this changeover control. The control apparatus 90 repeatedly performs changeover control from the start of action thereof until the stoppage thereof. Incidentally, when the control apparatus 90 starts acting, a prohibition flag for prohibiting the all-cylinder fuel cutoff process from being performed is OFF.

Figure 2:
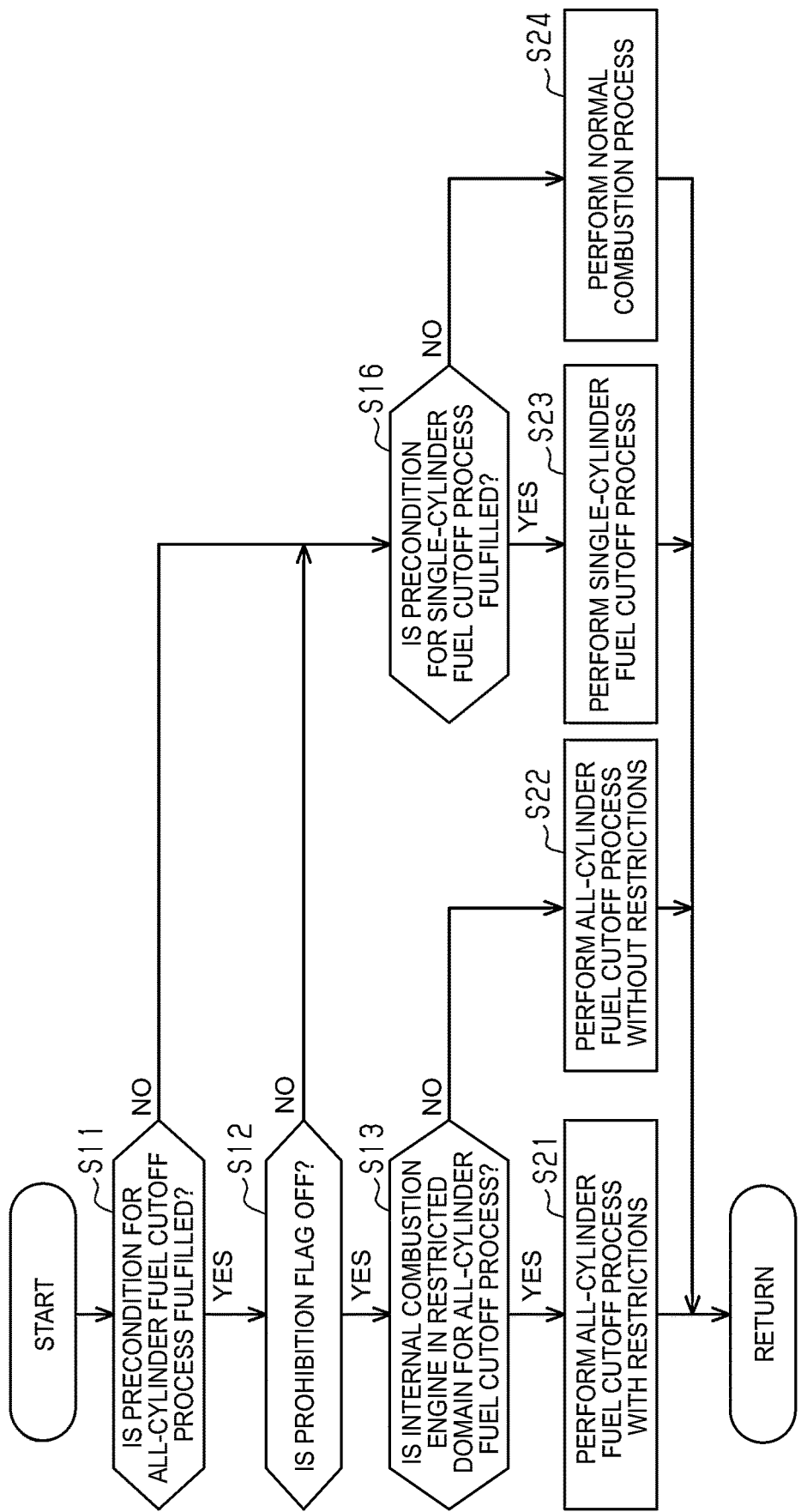
FIG. 2 is a flowchart showing changeover control.

As shown in FIG. 2, upon starting changeover control, the control apparatus 90 proceeds with the processing of step S11. In step S11, the control apparatus 90 determines whether or not a precondition determined in advance as a condition for performing the all-cylinder fuel cutoff process, namely, a fuel cutoff condition is fulfilled. It should be noted herein that the precondition for the all-cylinder fuel cutoff process includes, for example, both that the accelerator operation amount ACC is "0", and that the engine rotational speed NE is equal to or higher than a predetermined rotational speed determined in advance. That is, when the foregoing conditions are both fulfilled, the control apparatus 90 determines that the precondition for the all-cylinder fuel cutoff process is fulfilled. If it is determined in step S11 that the precondition for the all-cylinder fuel cutoff process is not fulfilled (NO in S11), the control apparatus 90 advances the process to step S16. Incidentally, if the prohibition flag is ON when the result of the determination in the processing of step S11 is negative, the control apparatus 90 sets the prohibition flag OFF. Besides, if the prohibition flag is OFF when the result of the determination in the processing of step S11 is negative, the control apparatus 90 holds the prohibition flag OFF. On the other hand, if it is determined in step S11 that the precondition for the all-cylinder fuel cutoff process is fulfilled (YES in S11), the control apparatus 90 advances the process to step S12.

In step S12, the control apparatus 90 determines whether or not the prohibition flag is OFF. If it is determined in step S12 that the prohibition flag is ON (NO in S12), the control apparatus 90 advances the process to step S16. On the other hand, if it is determined in step S12 that the prohibition flag is OFF (YES in S12), the control apparatus 90 advances the process to step S13.

In step S13, the control apparatus 90 determines whether or not the internal combustion engine 10 is in a restricted domain where the all-cylinder fuel cutoff process should be restricted. It should be noted herein that, for example, either a condition that the PM deposition amount PS is equal to or larger than a predetermined deposition amount determined in advance or a condition that the filter temperature TF is equal to or higher than a predetermined temperature determined in advance is fulfilled in the restricted domain. That is, when at least one of the foregoing conditions is fulfilled, the control apparatus 90 determines that the internal combustion engine 10 is in the restricted domain.

Incidentally, the predetermined deposition amount is determined as follows. As the PM deposition amount PS increases, the amount of particulate matter burning in the filter 28 tends to increase, and hence the filter temperature TF tends to rise in the all-cylinder fuel cutoff process. Thus, the predetermined deposition amount is determined in advance through an experiment or the like as a deposition amount that prevents the filter temperature TF from becoming equal to or higher than a certain temperature even when the all-cylinder fuel cutoff process is performed. Besides, the predetermined temperature is determined as follows. The filter temperature TF tends to rise in the all-cylinder fuel cutoff process as the filter temperature TF in carrying out step S13 rises. Thus, the predetermined temperature is determined in advance through an experiment or the like as a temperature that prevents the filter temperature TF from becoming equal to or higher than a certain temperature even when the all-cylinder fuel cutoff process is performed afterward with the predetermined temperature set as an initial temperature.

If it is determined in step S13 that the internal combustion engine 10 is in the restricted domain where the all-cylinder fuel cutoff process should be restricted (YES in S13), the control apparatus 90 advances the process to step S21. In step S21, the control apparatus 90 chooses to perform the all-cylinder fuel cutoff process with restrictions. Incidentally, the all-cylinder fuel cutoff process with restrictions is a process that allows the all-cylinder fuel cutoff process to be cancelled halfway in accordance with other conditions even in a situation where the precondition for the all-cylinder fuel cutoff process is fulfilled. Incidentally, the details of the all-cylinder fuel cutoff process with restrictions will be described later. After that, the control apparatus 90 ends the current changeover control, and advances the process to step S11.

On the other hand, if it is determined in step S13 that the internal combustion engine 10 is not in the restricted domain where the all-cylinder fuel cutoff process should be restricted (NO in S13), the control apparatus 90 advances the process to step S22. In step S22, the control apparatus 90 chooses to perform the all-cylinder fuel cutoff process without restrictions. When the all-cylinder fuel cutoff process without restrictions is performed, a series of changeover control is repeated to continue to perform the all-cylinder fuel cutoff process. In concrete terms, when the precondition for the all-cylinder fuel cutoff process is fulfilled (YES in step S11) and the condition that the internal combustion engine 10 is not in the restricted domain for the all-cylinder fuel cutoff process is fulfilled (NO in step S13), the all-cylinder fuel cutoff process continues to be performed without being restricted by other conditions. After that, the control apparatus 90 ends the current changeover control, and advances the process to step S11.

On the other hand, as described above, if it is determined that the precondition for the all-cylinder fuel cutoff process is not fulfilled (NO in S11) or if it is determined that the prohibition flag is ON (NO in S12), the control apparatus 90 advances the process to step S16.

In step S16, the control apparatus 90 determines whether or not a precondition determined in advance for the single-cylinder fuel cutoff process is fulfilled. It should be noted herein that the precondition for the single-cylinder fuel cutoff process includes, for example, both that the accelerator operation amount ACC is larger than "zero" and that the required output of the internal combustion engine 10 is equal to or smaller than a predetermined output determined in advance. That is, when the foregoing conditions are both fulfilled, the control apparatus 90 determines that the precondition for the single-cylinder fuel cutoff process is fulfilled.

If it is determined in step S16 that the precondition for the single-cylinder fuel cutoff process is fulfilled (YES in S16), the control apparatus 90 advances the process to step S23. In step S23, the control apparatus 90 chooses to perform the single-cylinder fuel cutoff process. After that, the control apparatus 90 ends the current changeover control, and advances the process to step S11.

If it is determined in step S16 that the precondition for the single-cylinder fuel cutoff process is not fulfilled (NO in S16), the control apparatus 90 advances the process to step S24. In step S24, the control apparatus 90 chooses to perform a normal combustion process. Incidentally, the normal combustion process is a process of burning the air-fuel mixture in all of the four cylinders 11 by supplying fuel to all of the four cylinders 11. After that, the control apparatus 90 ends the current changeover control, and advances the process to step S11.

(Cancellation Control)

Next, cancellation control performed by the control apparatus 90 will be described. Upon starting the all-cylinder fuel cutoff process with restrictions, the control apparatus 90 performs cancellation control for cancelling the all-cylinder fuel cutoff process. Besides, upon ending the all-cylinder fuel cutoff process with restrictions, the control apparatus 90 ends cancellation control. Incidentally, the control apparatus 90 repeatedly performs changeover control in parallel with cancellation control, even during the performance of cancellation control.

Figure 3:
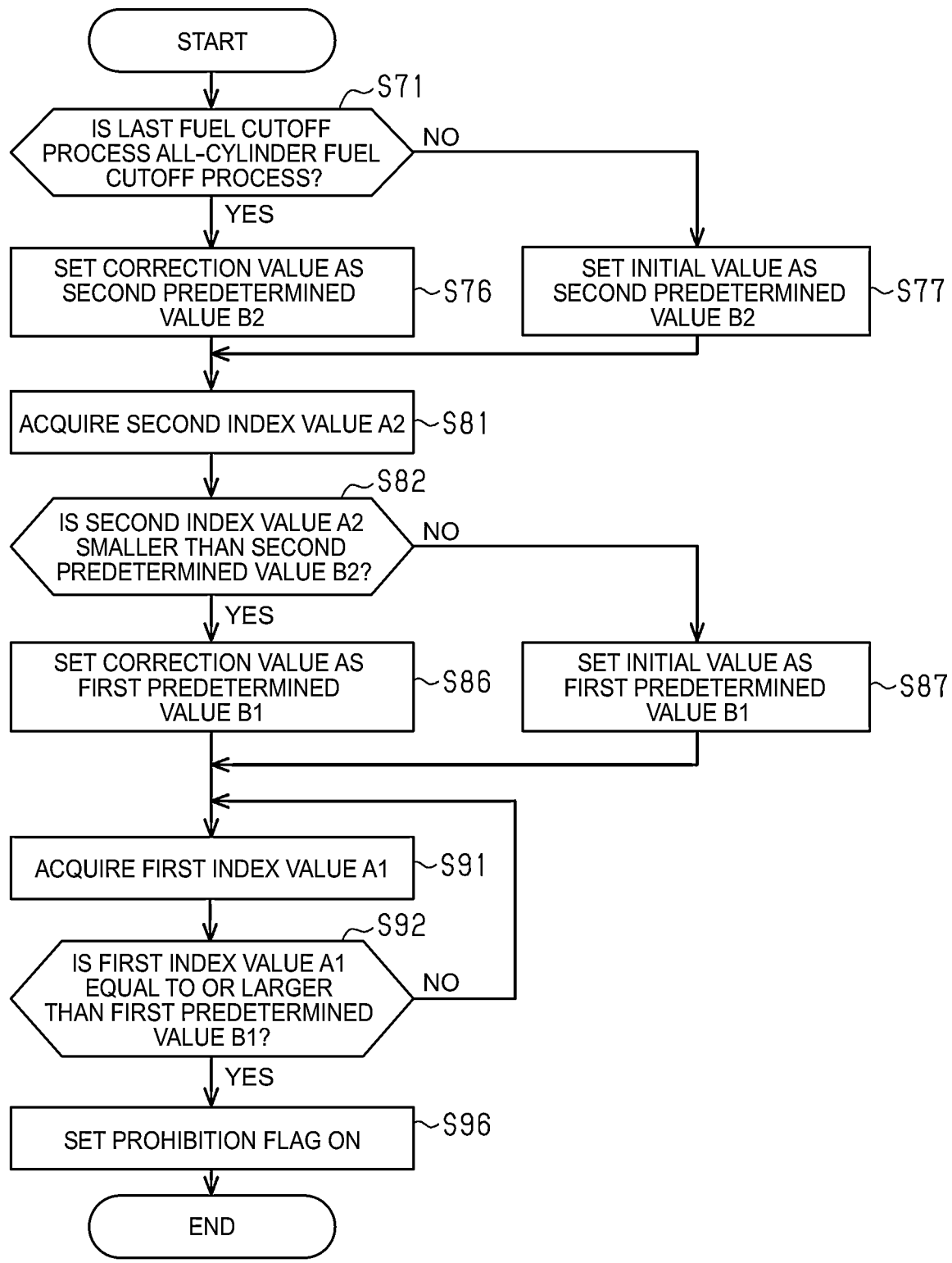
FIG. 3 is a flowchart showing cancellation control.

As shown in FIG. 3, upon starting cancellation control, the control apparatus 90 advances the process to step S71. In step S71, the control apparatus 90 determines whether or not the last fuel cutoff process is the all-cylinder fuel cutoff process. If it is determined in step S71 that the last fuel cutoff process is the all-cylinder fuel cutoff process (YES in S71), the control apparatus 90 advances the process to step S76. On the other hand, if it is determined in step S71 that the last fuel cutoff process is not the all-cylinder fuel cutoff process, namely, that the last fuel cutoff process is the single-cylinder fuel cutoff process (NO in S71), the control apparatus 90 advances the process to step S77.

In step S77, the control apparatus 90 sets an initial value of a second predetermined value B2 determined in advance as the current second predetermined value B2. It should be noted herein that the initial value of the second predetermined value B2 is determined as follows. When the normal combustion process is performed after performing the single-cylinder fuel cutoff process as the last fuel cutoff process, exhaust gas flows into the filter 28 from the cylinders 11. When exhaust gas thus flows into the filter 28, the amount of oxygen remaining in the filter 28 decreases as a result of the last fuel cutoff process. Then, when the integrated value of the amount of exhaust gas flowing into the filter 28 becomes equal to or larger than a certain value, the amount of oxygen remaining in the filter 28 becomes substantially equal to zero. Thus, an amount of intake air that makes the amount of exhaust gas equal to the aforementioned constant value is set as the initial value of the second predetermined value B2. After that, the control apparatus 90 advances the process to step S81.

On the other hand, as described above, if it is determined that the last fuel cutoff process is the all-cylinder fuel cutoff process (YES in S71), the control apparatus 90 advances the process to step S76. In step S76, the control apparatus 90 sets a value obtained by correcting the initial value of the second predetermined value B2 as the current second predetermined value B2. In concrete terms, the control apparatus 90 calculates the corrected second predetermined value B2 by multiplying the initial value of the second predetermined value B2 by a coefficient determined in advance. Incidentally, the coefficient in step S76 is a value larger than 1. Accordingly, the corrected second predetermined value B2 is larger than the initial value of the second predetermined value B2. After that, the control apparatus 90 advances the process to step S81.

In step S81, the control apparatus 90 acquires a second index value A2 that is an integrated value of the amount of intake air from the end of the last fuel cutoff process to the start of the current fuel cutoff process. For example, the control apparatus 90 acquires an integrated value of the intake air amount GA detected from the end of the last fuel cutoff process to the current fuel cutoff process, as the second index value A2. Incidentally, the integrated value of the intake air amount GA continues to increase as long as the internal combustion engine 10 is in operation. Accordingly, the second index value A2 changes in an increasing manner as the elapsed time from the end of the last fuel cutoff process to the start of the current fuel cutoff process lengthens. In the present embodiment, the processing of step S81 is an example of the second acquisition process. After that, the control apparatus 90 advances the process to step S82.

In step S82, the control apparatus 90 determines whether or not the second index value A2 is smaller than the second predetermined value B2. In step S82, if it is determined that the second index value A2 is smaller than the second predetermined value B2 (YES in S82), the control apparatus 90 advances the process to step S86. On the other hand, if it is determined in step S82 that the second index value A2 is equal to or larger than the second predetermined value B2 (NO in S82), the control apparatus 90 advances the process to step S87.

In step S87, the control apparatus 90 sets an initial value of the first predetermined value B1 determined in advance, as the current first predetermined value B1. It should be noted herein that the initial value of the first predetermined value B1 is determined as follows. When the all-cylinder fuel cutoff process is performed as the fuel cutoff process, the intake air that has not been burned, namely, the air containing oxygen is supplied to the filter 28 from the cylinders 11. After the supply of oxygen to the filter 28 in this manner, as the integrated value of the amount of supplied oxygen increases, the amount of particulate matter burning in the filter 28 increases, and hence the filter temperature TF rises. When the filter temperature TF becomes excessively high, the function of the filter 28 may deteriorate. Accordingly, an upper limit of the amount of oxygen that can be supplied to the filter 28 without causing a deterioration in function of the filter 28 or the like in the all-cylinder fuel cutoff process on the assumption that the amount of oxygen in the filter 28 is zero in starting the all-cylinder fuel cutoff process is obtained in advance through an experiment or the like. The aforementioned upper limit is then set as the initial value of the first predetermined value B1. After that, the control apparatus 90 advances the process to step S91.

On the other hand, as described above, if it is determined in step S82 that the second index value A2 is smaller than the second predetermined value B2 (YES in S82), the control apparatus 90 advances the process to step S86.

In step S86, the control apparatus 90 sets a value obtained by correcting the initial value of the first predetermined value B1, as the current first predetermined value B1. In concrete terms, the control apparatus 90 calculates the corrected first predetermined value B1 by multiplying the initial value of the first predetermined value B1 by a first or second coefficient determined in advance. Then, when the last fuel cutoff process is the all-cylinder fuel cutoff process, the control apparatus 90 calculates the corrected first predetermined value B1 by multiplying the initial value of the first predetermined value B1 by the first coefficient. On the other hand, when the last fuel cutoff process is the single-cylinder fuel cutoff process, the control apparatus 90 calculates the corrected first predetermined value B1 by multiplying the initial value of the first predetermined value B1 by the second coefficient. Both the first coefficient and the second coefficient are smaller than 1. Accordingly, the corrected first predetermined value B1 is smaller than the initial value of the first predetermined value B1. Furthermore, the first coefficient is smaller than the second coefficient. Accordingly, the corrected first predetermined value B1 is smaller when the last fuel cutoff process is the all-cylinder fuel cutoff process than when the last fuel cutoff process is the single-cylinder fuel cutoff process. Incidentally, the first predetermined value B1 has thus been corrected to a value smaller than the initial value of the first predetermined value B1 in the situation where a request is made to shorten the all-cylinder fuel cutoff process. In the present embodiment, the processing of step S71, step S76, step S77, step S82, step S86, and step S87 is an example of the change process. After that, the control apparatus 90 advances the process to step S91.

In step S91, the control apparatus 90 acquires a first index value A1 that is an integrated value of the amount of intake air flowing to the filter 28 during the performance of the current all-cylinder fuel cutoff process. For example, the control apparatus 90 acquires an integrated value of the intake air amount GA detected during the performance of the current all-cylinder fuel cutoff process, as the first index value A1. In the present embodiment, the processing of step S91 is an example of the first acquisition process. After that, the control apparatus 90 advances the process to step S92.

In step S92, the control apparatus 90 determines whether or not the first index value A1 is equal to or larger than the first predetermined value B1. If it is determined in step S92 that the first index value A1 is smaller than the first predetermined value B1 (NO in S92), the control apparatus 90 returns the process to step S91. On the other hand, if it is determined in step S92 that the first index value A1 is equal to or larger than the first predetermined value B1 (YES in S92), the control apparatus 90 advances the process to step S96.

In step S96, the control apparatus 90 sets the prohibition flag ON. Incidentally, in this case, the all-cylinder fuel cutoff process is prohibited in changeover control that is performed in parallel. As a result, the all-cylinder fuel cutoff process that is being performed is cancelled. After that, the control apparatus 90 ends the current cancellation control. Incidentally, in the present embodiment, the processing of step S92 and step S96 is an example of the cancellation process.

Operation of Present Embodiment

Figure 4:
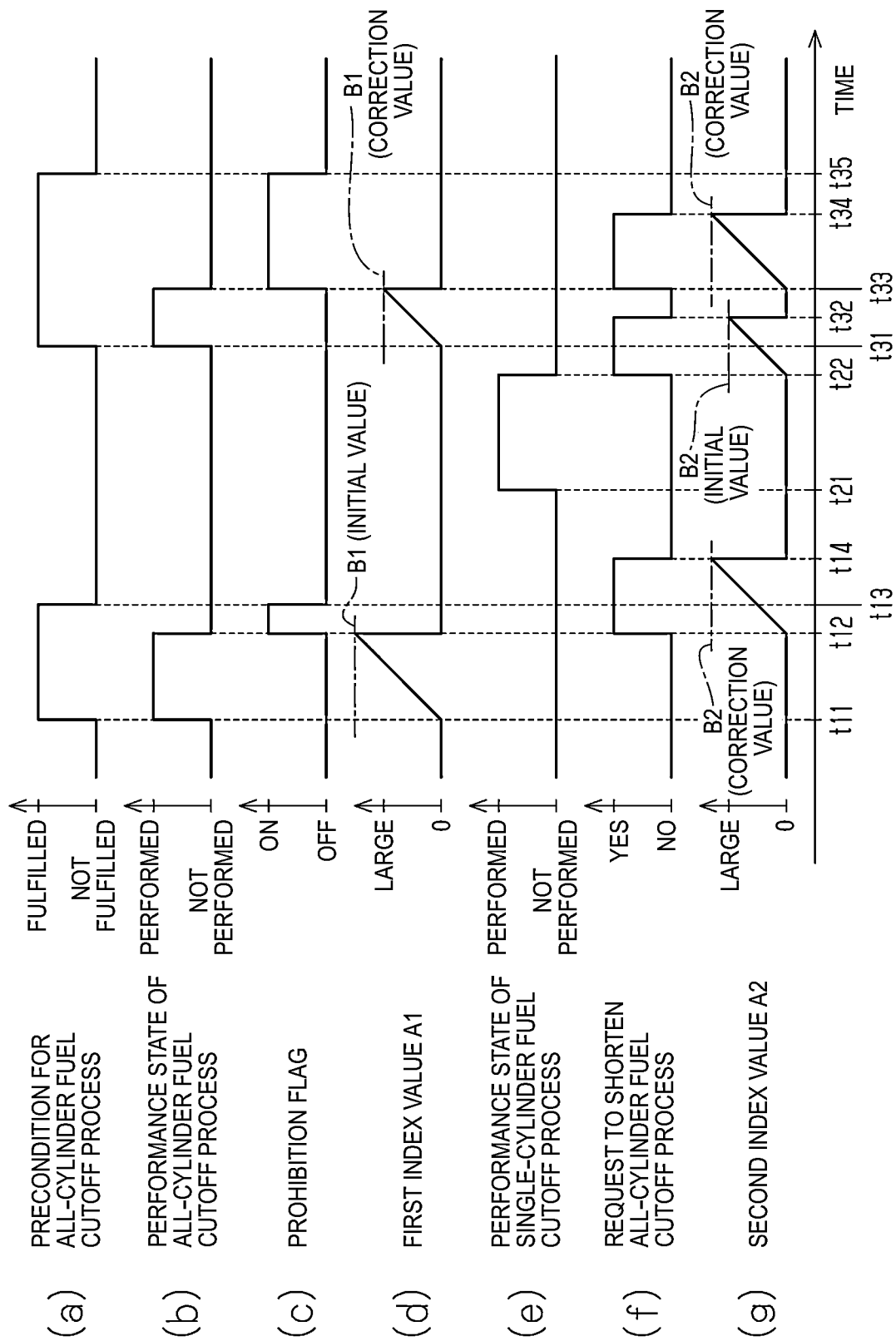
FIG. 4 is a time chart, where a portion (a) of FIG. 4 shows how the state of fulfillment of a precondition for an all-cylinder fuel cutoff process changes, a portion (b) of FIG. 4 shows how the state of performance of the all-cylinder fuel cutoff process changes, a portion (c) of FIG. 4 shows how the state of a prohibition flag changes, a portion (d) of FIG. 4 shows how a first index value changes, a portion (e) of FIG. 4 shows how the state of performance of a single-cylinder fuel cutoff process changes, a portion (0 of FIG. 4 shows how a request to shorten the all-cylinder fuel cutoff process changes, and a portion (g) of FIG. 4 shows how a second index value changes.

First of all, it is assumed that the all-cylinder fuel cutoff process and the single-cylinder fuel cutoff process are not performed before a timing t11, as shown in a portion (b) of FIG. 4 and a portion (e) of FIG. 4. Besides, it is assumed that the all-cylinder fuel cutoff process that is performed at and after the timing t11 is the all-cylinder fuel cutoff process with restrictions.

As shown in a portion (a) of FIG. 4, it is assumed that the precondition for the all-cylinder fuel cutoff process is fulfilled from the timing t11 to a timing t13. In this case, the all-cylinder fuel cutoff process is started at the timing t11, as shown in the portion (b) of FIG. 4. At this time, intake air flows to the filter 28 from the cylinders 11, so the integrated value of the intake air amount GA that is the first index value A1 gradually increases at and after the timing t11, as shown in a portion (d) of FIG. 4. The first index value A1 then becomes equal to or larger than the first predetermined value B1 at a timing t12, so the prohibition flag is set ON to cancel the all-cylinder fuel cutoff process, as shown in a portion (c) of FIG. 4. As a result, from the timing t12 to the timing t13, although the precondition for the all-cylinder fuel cutoff process is fulfilled as shown in the portion (a) of FIG. 4, the all-cylinder fuel cutoff process is not performed as shown in the portion (b) of FIG. 4.

Besides, it is assumed that the normal combustion process is performed from the timing t12 to a timing t21. At this time, intake air is supplied in the course of operation of the internal combustion engine 10, so the integrated value of the intake air amount GA that is the second index value A2 gradually increases at and after the timing t12, as shown in a portion (g) of FIG. 4. Incidentally, from the timing t12 to a timing t14, the second index value A2 is smaller than the second predetermined value B2, and the amount of exhaust gas flowing to the filter 28 from the cylinders 11 is small. Therefore, as shown in a portion (0 of FIG. 4, a request is made to shorten the all-cylinder fuel cutoff process, that is, the first predetermined value B1 becomes smaller than the initial value due to the performance of the processing of step S86. It should be noted, however, that in this example, since the all-cylinder fuel cutoff process is not performed in a period from the timing t12 to the timing t14, the all-cylinder fuel cutoff process is actually not cancelled. On the other hand, at and after the timing t14, the second index value A2 is equal to or larger than the second predetermined value B2, and the amount of exhaust gas flowing to the filter 28 from the cylinders 11 is large. Therefore, no request is made to shorten the all-cylinder fuel cutoff process, as shown in the portion (f) of FIG. 4. Incidentally, in the portion (g) of FIG. 4, the second index value A2 is cleared to zero upon reaching the second predetermined value B2.

As shown in the portion (e) of FIG. 4, it is assumed that the single-cylinder fuel cutoff process is performed from the timing t21 to a timing t22. As a result, the amount of oxygen present in the filter 28 increases due to the supply of intake air to the filter 28 through the single-cylinder fuel cutoff process, from the timing t21 to the timing t22. Besides, it is assumed that the normal combustion process is later performed at and after the timing t22. At this time, intake air is supplied in the course of operation of the internal combustion engine 10, so the second index value A2 gradually increases at and after the timing t22, as shown in the portion (g) of FIG. 4. Then, a request is made to shorten the all-cylinder fuel cutoff process until a timing t32 when the second index value A2 becomes equal to or larger than the second predetermined value B2.

It should be noted herein that the precondition for the all-cylinder fuel cutoff process is assumed to be fulfilled at a timing t31 preceding the timing t32, as shown in the portion (a) of FIG. 4. The all-cylinder fuel cutoff process is then performed at and after the timing t31, as shown in the portion (b) of FIG. 4. Then, the first index value A1 gradually increases at and after the timing t31, as shown in the portion (d) of FIG. 4. It should be noted herein that since the second index value A2 is smaller than the second predetermined value B2 at the timing t31 as shown in the portion (g) of FIG. 4, the first predetermined value B1 in the all-cylinder fuel cutoff process at and after the timing t31 is smaller than the initial value of the first predetermined value B1 as shown in the portion (d) of FIG. 4. Therefore, in the all-cylinder fuel cutoff process at and after the timing t31, even when, for example, the first index value A1 is large as is the case with the all-cylinder fuel cutoff process at and after the timing t11, the timing t33 when it is determined that the first index value A1 is equal to or larger than the first predetermined value B1 is advanced. Accordingly, the prohibition flag turns ON at an early timing. In this example, the period from the timing t31 to the timing t33 is shorter than the period from the timing t11 to the timing t12. That is, the all-cylinder fuel cutoff process is cancelled at an early stage.

Incidentally, when the all-cylinder fuel cutoff process is cancelled at the timing t33, the second index value A2 gradually increases through the performance of the normal combustion process. Then, until the second index value A2 becomes equal to or larger than the second predetermined value B2, there is a request to shorten the all-cylinder fuel cutoff process. In the following period including the timing t33, the last fuel cutoff process is the all-cylinder fuel cutoff process. Accordingly, as shown in the portion (g) of FIG. 4, the second predetermined value B2 is larger at and after the timing t33 than in the period from the timing t22 to the timing t32 after the performance of the single-cylinder fuel cutoff process as the last fuel cutoff process.

Effects of Present Embodiment (1) As shown in the portion (g) of FIG. 4, the second index value A2 is smaller than the second predetermined value B2 at the timing t31. Accordingly, as long as the other conditions are the same, the all-cylinder fuel cutoff process that is started at the timing t31 is cancelled earlier than the all-cylinder fuel cutoff process that is started at the timing tn. Accordingly, in the all-cylinder fuel cutoff process that is started at the timing t31, the amount of oxygen supplied to the filter 28 from the cylinders 11 is relatively small. Therefore, the period from the timing t22 to the timing t31 is short. That is, even when the current fuel cutoff process is performed before the lapse of a sufficient time from the end of the last fuel cutoff process, the filter 28 can be restrained from being overheated in the all-cylinder fuel cutoff process that is started at the timing t31.

(2) In the present embodiment, when the all-cylinder fuel cutoff process is performed, the supply of fuel to all of the four cylinders 11 is stopped, so a larger amount of oxygen can be supplied to the filter 28 than in the case where the single-cylinder fuel cutoff process is performed. Therefore, the amount of oxygen remaining in the filter 28 is likely to be larger after the end of the all-cylinder fuel cutoff process than after the end of the single-cylinder fuel cutoff process.

In this respect, according to the present embodiment, the first predetermined value B1 is smaller when the last fuel cutoff process is the all-cylinder fuel cutoff process than when the last fuel cutoff process is the single-cylinder fuel cutoff process. Accordingly, in the present embodiment, the first predetermined value B1 is adjusted taking into account that the amount of oxygen remaining in the filter 28 is large after the end of the all-cylinder fuel cutoff process. Thus, the current all-cylinder fuel cutoff process is cancelled earlier when the last fuel cutoff process is the all-cylinder fuel cutoff process than when the last fuel cutoff process is the single-cylinder fuel cutoff process. As a result, the timing for cancelling the current all-cylinder fuel cutoff process can be adjusted appropriately.

(3) In the present embodiment, the second predetermined value B2 is larger when the last fuel cutoff process is the all-cylinder fuel cutoff process than when the last fuel cutoff process is the single-cylinder fuel cutoff process. Therefore, for example, the second predetermined value B2 is larger than the initial value of the second predetermined value B2 at and after the timing t33 as shown in the portion (g) of FIG. 4, through the performance of the all-cylinder fuel cutoff process from the timing t31 to the timing t33 as shown in the portion (b) of FIG. 4. Thus, at and after the timing t33, it is likely to be determined that the second index value A2 is smaller than the second predetermined value B2, for example, even when the second index value A2 becomes large in the same manner as at and after the timing t22. As a result, as shown in the portion (0 of FIG. 4, the period in which there is a request to shorten the all-cylinder fuel cutoff process is longer at and after the timing t33 than at and after the timing t22. That is, in the present embodiment, the second predetermined value B2 is adjusted taking into account that the amount of oxygen remaining in the filter 28 is large after the end of the all-cylinder fuel cutoff process. Therefore, the period in which a process of reducing the first predetermined value B1 is performed can be adjusted appropriately.

(4) In the internal combustion engine 10, the amount of oxygen remaining in the filter 28 changes in accordance with the operating state of the internal combustion engine 10, even when the time from the end of the last fuel cutoff process to the subsequent resumption of the fuel cutoff process remains unchanged. In concrete terms, the amount of oxygen remaining in the filter 28 in starting the current fuel cutoff process tends to decrease as the amount of exhaust gas flowing through the filter 28 from the cylinders 11 after the last fuel cutoff process increases.

In this respect, according to the present embodiment, the control apparatus 90 acquires the second index value A2 that is the integrated value of the amount of intake air from the end of the last fuel cutoff process to the start of the current fuel cutoff process. The second index value A2 is a value indicating the amount of exhaust gas flowing through the filter 28 from the cylinders 11. Accordingly, it can be determined whether or not the second index value A2 is equal to or larger than the second predetermined value B2, by appropriately reflecting the amount of oxygen remaining in the filter 28 when the current all-cylinder fuel cutoff process is performed, through the use of the second index value A2 corresponding to the operating state of the internal combustion engine 10.

(5) It is assumed that the integrated value of the amount of intake air actually supplied to the filter 28 during the performance of the all-cylinder fuel cutoff process is used as the first index value A1. It should be noted herein that the normal combustion process is assumed to have been performed upon cancellation of the all-cylinder fuel cutoff process, in response to a determination that the first index value A1 is equal to or larger than the first predetermined value B1 at the timing t33, as shown in FIG. 4. In this case, even when the normal combustion process is performed upon cancellation of the all-cylinder fuel cutoff process, the intake air present between the cylinders 11 and the filter 28 at the timing t33 flows to the filter 28 later. As a result, the filter 28 may be overheated as a result of the supply of intake air to the filter 28 in an amount larger than the first predetermined value B1.

In this respect, according to the present embodiment, the control apparatus 90 acquires the integrated value of the intake air amount GA detected during the performance of the current all-cylinder fuel cutoff process, as the first index value A1. That is, the value detected by the airflow meter 81 located upstream of the filter 28 is used as the first index value A1. Therefore, at the timing t33 when it is determined that the first index value A1 is equal to or larger than the first predetermined value B1, the amount of intake air actually supplied to the filter 28 tends to be smaller than the first predetermined value B1. Accordingly, the filter 28 can be restrained from being overheated even when the intake air present between the cylinders 11 and the filter 28 at the timing t33 flows to the filter 28.

MODIFICATION EXAMPLES

The present embodiment can be carried out after being modified as follows. The present embodiment and the following modification examples can be carried out in combination with one another within a range where there is no technical contradiction.

In the aforementioned embodiment, the condition for adjusting the first predetermined value B1 in the change process can be changed. For example, the control apparatus 90 may reduce the first predetermined value B1 either stepwise or in a stepless manner as the second index value A2 decreases. In this manner, it is sufficient to provide a range where the first predetermined value B1 decreases as the second index value A2 decreases regardless of whether the first predetermined value B1 decreases stepwise or in a stepless manner. Incidentally, when the first predetermined value B1 decreases in a stepless manner, the processing of determination in step S82 is omitted, and the second index value A2 is assigned to a function determined in advance or the like to make it possible to obtain the first predetermined value B1.

In the aforementioned embodiment, the speed of increase in the first index value A1 may be changed instead of or in addition to the adjustment of the first predetermined value B1 in the change process. As a concrete example, when it is determined that the second index value A2 is smaller than the second predetermined value B2, the control apparatus 90 corrects the first index value A1 by multiplying the first index value A1 by a coefficient larger than 1. The control apparatus 90 may then use the corrected first index value A1 in the following processes. In this manner, the control apparatus 90 may make the speed of increase in the first index value A1 with respect to the integrated amount of intake air higher when the second index value A2 is small than when the second index value A2 is large in starting the fuel cutoff process, in the first acquisition process. Incidentally, the coefficient may increase as the second index value A2 decreases.

In the aforementioned embodiment, the first index value A1 may be changed. For example, a duration time during which the current all-cylinder fuel cutoff process is performed may be used as the first index value A1.

In the aforementioned embodiment, the second index value A2 may be changed. For example, an elapsed time from the end of the last fuel cutoff process to the start of the current fuel cutoff process may be used as the second index value A2. Alternatively, an amount of exhaust gas supplied to the filter 28 from the cylinders 11 from the end of the last fuel cutoff process to the start of the current fuel cutoff process may be used as the second index value A2. Incidentally, the amount of exhaust gas can be unambiguously calculated from the intake air amount GA and the fuel injection amount or the like.

In the aforementioned embodiment, the configuration of setting the first predetermined value B1 may be changed in accordance with the type of the last fuel cutoff process. For example, in carrying out step S86, the control apparatus 90 stores a first value that is smaller than the initial value of the first predetermined value B1, and a second value that is smaller than the initial value of the first predetermined value B1 and larger than the first value. Then in step S86, when the last fuel cutoff process is the all-cylinder fuel cutoff process, the control apparatus 90 may set the first value as the current first predetermined value B1. Besides, in step S86, when the last fuel cutoff process is the single-cylinder fuel cutoff process, the control apparatus 90 may set the second value as the current first predetermined value B1. That is, in step S86, the control apparatus 90 may set the current first predetermined value B1 without correcting the initial value of the first predetermined value B1.

In the aforementioned embodiment, the first predetermined value B1 to be set may be changed in accordance with the situation of the last fuel cutoff process. For example, the control apparatus 90 stores the first index value A1 acquired upon the end of the last fuel cutoff process. The control apparatus 90 may then reduce the first predetermined value B1 to be set in the subsequent fuel cutoff process as the stored first index value A1 increases. In the vehicle 100, the possibility of the oxygen supplied through the last fuel cutoff process remaining in the filter 28 rises as the first index value A1 upon the end of the last fuel cutoff process increases. In this respect, according to the aforementioned configuration, the first predetermined value B1 in the current fuel cutoff process is adjusted in accordance with the first index value A1 upon the end of the last fuel cutoff process. Thus, the fuel cutoff process can be cancelled at a more appropriate timing.

In the aforementioned embodiment, the first predetermined value B1 may not be changed in accordance with the type of the last fuel cutoff process. That is, the first predetermined value B1 may be used regardless of the type of the last fuel cutoff process. As a concrete example, the same first predetermined value B1 may be used regardless of the type of the last fuel cutoff process, by using the same coefficient instead of using separate coefficients, namely, the first coefficient and the second coefficient in step S86.

In the aforementioned embodiment, the configuration of setting the second predetermined value B2 may be changed in accordance with the type of the last fuel cutoff process. For example, the control apparatus 90 stores a value larger than the initial value of the second predetermined value B2, in carrying out step S76. Then in step S76, the control apparatus 90 may set the value larger than the initial value of the second predetermined value B2 as the current second predetermined value B2. That is, in step S76, the control apparatus 90 may set the current second predetermined value B2 without correcting the initial value of the second predetermined value B2.

In the aforementioned embodiment, the second predetermined value B2 to be set may be changed in accordance with the situation of the last fuel cutoff process. For example, the control apparatus 90 stores the first index value A1 acquired upon the end of the last fuel cutoff process. The control apparatus 90 may then increase the second predetermined value B2 to be set in the subsequent fuel cutoff process as the stored first index value A1 increases. According to the aforementioned configuration, the second predetermined value B2 in the current fuel cutoff process can be adjusted in accordance with the first index value A1 upon the end of the last fuel cutoff process. Thus, it can be determined whether to reduce the first predetermined value B1 or not, in accordance with the amount of oxygen remaining in the last fuel cutoff process.

In the aforementioned embodiment, the second predetermined value B2 may not be changed in accordance with the type of the last fuel cutoff process. That is, the same second predetermined value B2 may be used regardless of the type of the last fuel cutoff process. As a concrete example, the processing of step S71 may be omitted, and the control apparatus 90 may proceed with the processing of step S77 in starting cancellation control.

In the aforementioned embodiment, the same first predetermined value B1 may be used regardless of the second index value A2, depending on the situation of cancellation of the last all-cylinder fuel cutoff process. For example, when the last all-cylinder fuel cutoff process is cancelled due to non-fulfillment of the precondition for the all-cylinder fuel cutoff process, the amount of oxygen remaining in the filter 28 after the end of the last all-cylinder fuel cutoff process is likely to be small. Thus, when the last all-cylinder fuel cutoff process is cancelled due to non-fulfillment of the precondition for the all-cylinder fuel cutoff process, the same first predetermined value B1 may be used regardless of whether or not the second index value A2 is smaller than the second predetermined value B2. Thus, the circumstances where the all-cylinder fuel cutoff process is cancelled at an early stage despite the small amount of oxygen remaining in the filter 28 are unlikely to occur.

In the aforementioned embodiment, the art applied to cancel the all-cylinder fuel cutoff process at an early stage may also be applied as an art for cancelling the single-cylinder fuel cutoff process at an early stage. For example, oxygen is supplied to the filter 28 from the cylinders 11, by performing the single-cylinder fuel cutoff process. Then, when the amount of oxygen supplied to the filter 28 through the single-cylinder fuel cutoff process increases, the filter 28 may be overheated. Accordingly, in performing the single-cylinder fuel cutoff process, a first acquisition process for acquiring the first index value that increases as the integrated amount of intake air during the performance of the single-cylinder fuel cutoff process increases may be performed. Besides, during the performance of the single-cylinder fuel cutoff process, a cancellation process for cancelling the single-cylinder fuel cutoff process when the first index value becomes equal to or larger than the first predetermined value determined in advance may be performed. In this configuration, the art applied to cancel the all-cylinder fuel cutoff process at an early stage may be applied as an art for cancelling the single-cylinder fuel cutoff process at an early stage.

An example of changeover control for cancelling the single-cylinder fuel cutoff process at an early stage will be described hereinafter with reference to FIG. 5. Incidentally, the processing of steps S11 to S13, S21, and S22 in changeover control is the same as in the aforementioned embodiment.

Figure 5:
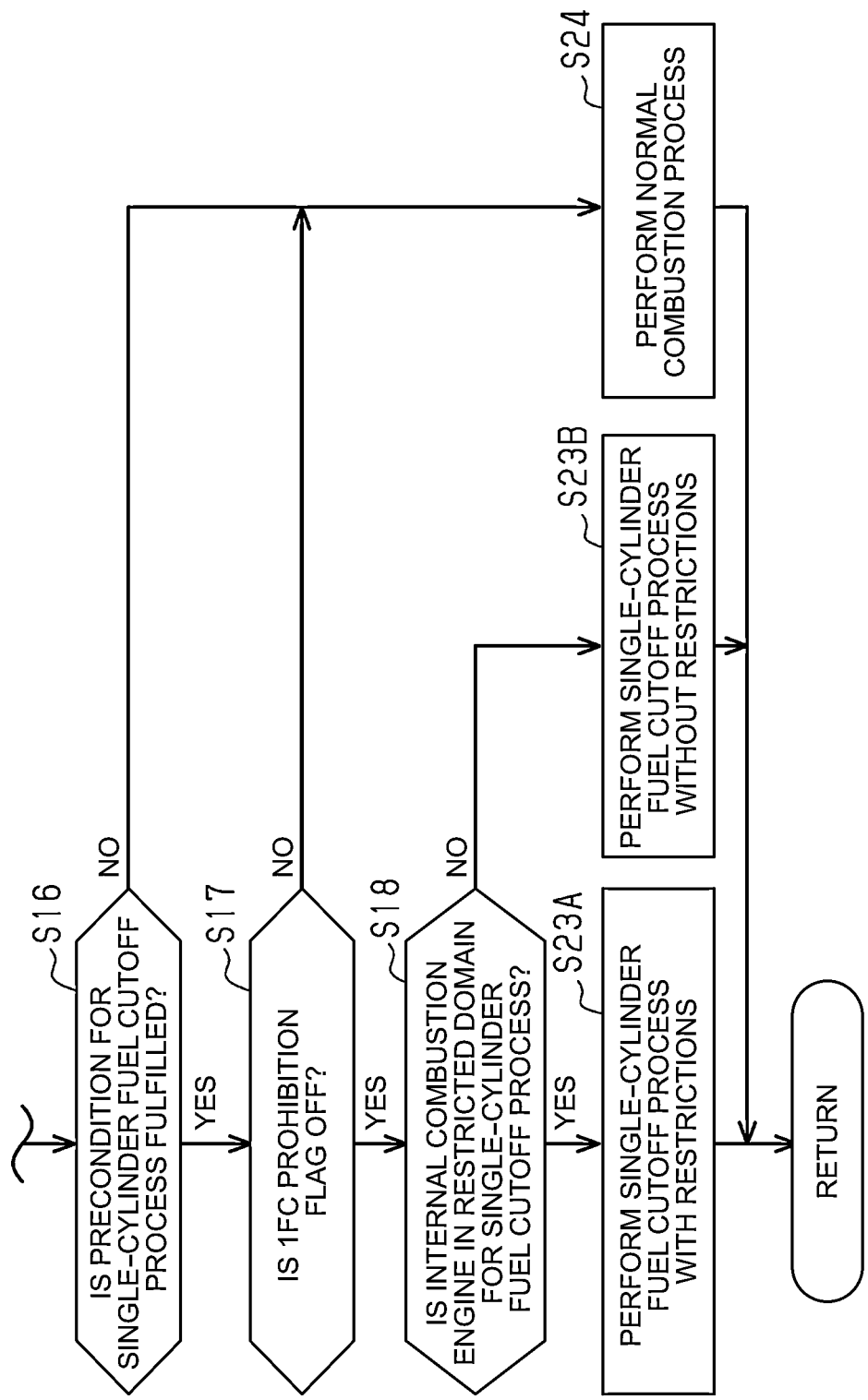
FIG. 5 is a flowchart showing changeover control in a modification example.

As shown in FIG. 5, if it is determined in step S16 that the precondition for the single-cylinder fuel cutoff process is fulfilled (YES in S16), the control apparatus 90 advances the process to step S17. In step S17, the control apparatus 90 determines whether or not the prohibition flag for prohibiting the single-cylinder fuel cutoff process from being performed is OFF. The prohibition flag for prohibiting the single-cylinder fuel cutoff process from being performed will be referred to hereinafter as a 1FC prohibition flag. Incidentally, the 1FC prohibition flag is OFF when the control apparatus 90 starts acting. If it is determined in step S17 that the 1FC prohibition flag is ON (NO in S17), the control apparatus 90 advances the process to step S24. On the other hand, if it is determined in step S17 that the 1FC prohibition flag is OFF (YES in S17), the control apparatus 90 advances the process to step S18.

In step S18, the control apparatus 90 determines whether or not the internal combustion engine 10 is in the restricted domain where the single-cylinder fuel cutoff process should be restricted. It should be noted herein that in the restricted domain, for example, either a condition that the PM deposition amount PS is equal to or larger than a predetermined deposition amount determined in advance or a condition that the filter temperature TF is equal to or higher than a predetermined temperature determined in advance. That is, the control apparatus 90 determines that the internal combustion engine 10 is in the restricted domain when at least one of the foregoing conditions is fulfilled.

If it is determined in step S18 that the internal combustion engine 10 is in the restricted domain where the single-cylinder fuel cutoff process should be restricted (YES in S18), the control apparatus 90 advances the process to step S23A. In step S23A, the control apparatus 90 chooses to perform the single-cylinder fuel cutoff process with restrictions. Incidentally, the single-cylinder fuel cutoff process with restrictions is a process that makes it possible to cancel the single-cylinder fuel cutoff process in accordance with other conditions, even in the situation where the precondition for the single-cylinder fuel cutoff process is fulfilled. Incidentally, the details of the single-cylinder fuel cutoff process with restrictions will be described later. After that, the control apparatus 90 ends the current changeover control, and advances the process to step S11.

On the other hand, if it is determined in step S18 that the internal combustion engine 10 is not in the restricted domain where the single-cylinder fuel cutoff process should be restricted (NO in S18), the control apparatus 90 advances the process to step S23B. In step S23B, the control apparatus 90 chooses to perform the single-cylinder fuel cutoff process without restrictions. After that, the control apparatus 90 ends the current changeover control, and advances the process to step S11. Incidentally, in the series of changeover control, the single-cylinder fuel cutoff process continues to be performed through repeated performance of the single-cylinder fuel cutoff process without restrictions.

Furthermore, an example of cancellation control for cancelling the single-cylinder fuel cutoff process at an early stage will be described hereinafter. In concrete terms, the control apparatus 90 performs cancellation control shown in FIG. 6, upon the start of the single-cylinder fuel cutoff process with restrictions.

Figure 6:
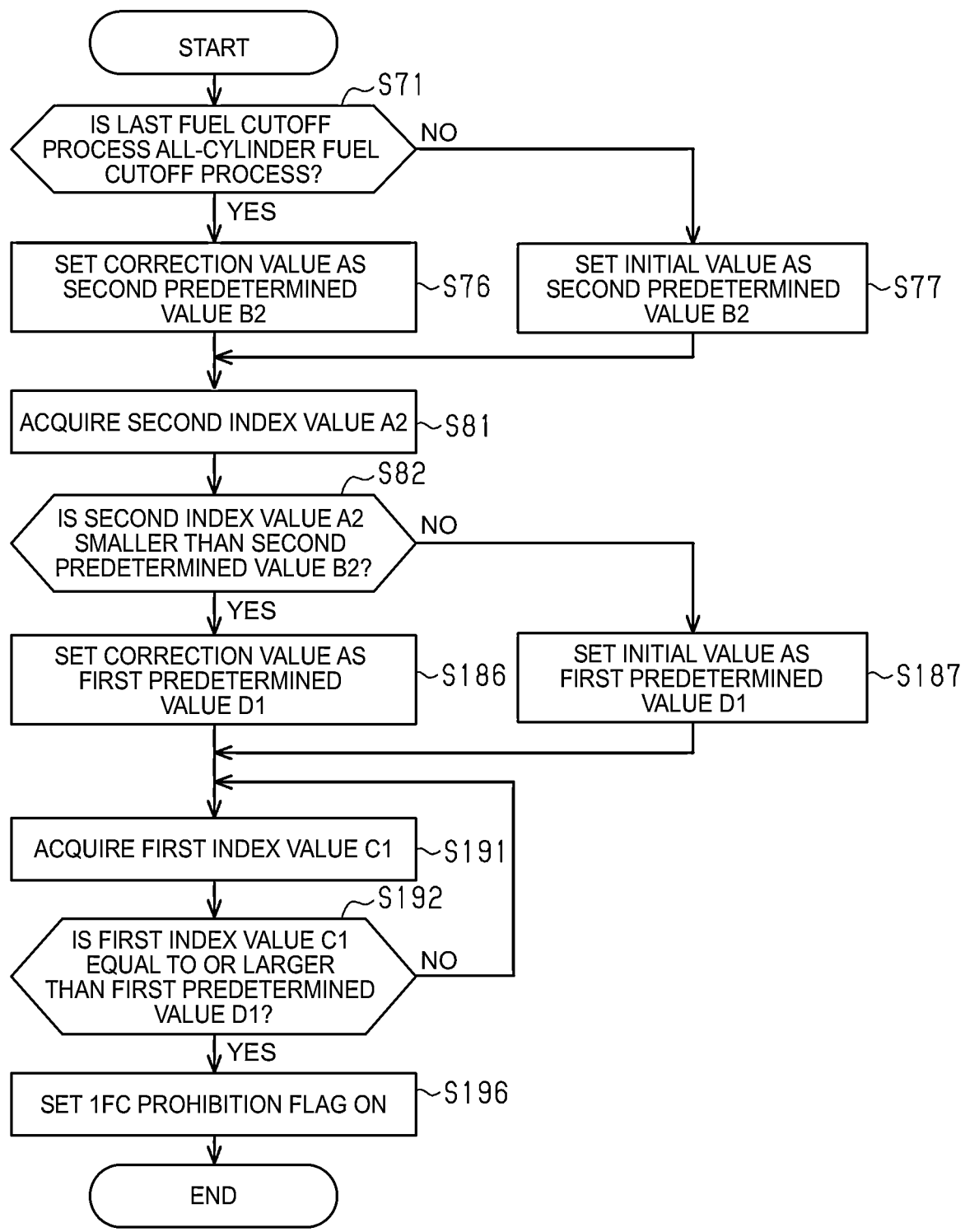
FIG. 6 is a flowchart showing cancellation control in the modification example.

As shown in FIG. 6, the control apparatus 90 performs the processing of steps S71 to S82 upon starting cancellation control. These processing steps are the same as those in the aforementioned embodiment shown in FIG. 3. On the other hand, the processing of steps S186 to S196 in cancellation control for cancelling the single-cylinder fuel cutoff process shown in FIG. 6 is different from the processing of steps S86 to S96 in cancellation control for cancelling the all-cylinder fuel cutoff process shown in FIG. 3. In concrete terms, in steps S186 and S187, the control apparatus 90 sets a first predetermined value D1 as a value for cancelling the current single-cylinder fuel cutoff process. Besides, in step S191, the control apparatus 90 acquires a first index value C1 that is an integrated value of the amount of intake air flowing to the filter 28, during the performance of the current single-cylinder fuel cutoff process.

Furthermore, in step S192, the control apparatus 90 determines whether or not the first index value C1 is equal to or larger than the first predetermined value D1. If it is determined in step S192 that the first index value C1 is smaller than the first predetermined value D1 (NO in S192), the control apparatus 90 returns the process to step S191. On the other hand, if it is determined in step S192 that the first index value C1 is equal to or larger than the first predetermined value D1 (YES in S192), the control apparatus 90 advances the process to step S196. The control apparatus 90 then sets the 1FC prohibition flag ON in step S196. Incidentally, in this case, the single-cylinder fuel cutoff process is prohibited in changeover control performed in parallel. As a result, the single-cylinder fuel cutoff process that is being performed is cancelled.

In the aforementioned embodiment, there is no need to perform both the processes, namely, the all-cylinder fuel cutoff process and the single-cylinder fuel cutoff process as the fuel cutoff process. One of the two processes may be performed as the fuel cutoff process. In this case, the present art may be applied to the fuel cutoff process that is performed.

In the aforementioned embodiment, the specific-cylinder fuel cutoff process may not necessarily be the single-cylinder fuel cutoff process. In concrete terms, any process for stopping the supply of fuel to one or some of the cylinders 11 while supplying fuel to the other cylinders 11 or the other cylinder 11 is regarded as the specific cylinder fuel cutoff process.

What is claimed is:

1. A control apparatus for an internal combustion engine that is equipped with a cylinder for burning fuel, a fuel injection valve for supplying fuel into the cylinder, an exhaust passage connected to the cylinder, and a filter located in the exhaust passage to collect particulate matter contained in exhaust gas, the control apparatus performing
a fuel cutoff process for stopping supply of fuel to the cylinder from the fuel injection valve when a fuel cutoff condition determined in advance is fulfilled,
a first acquisition process for acquiring a first index value that increases as an integrated amount of intake air during performance of the fuel cutoff process increases,
a cancellation process for cancelling the fuel cutoff process when the first index value becomes equal to or larger than a first predetermined value determined in advance, during performance of the fuel cutoff process,
a second acquisition process for acquiring a second index value that increases as an elapsed time from end of the fuel cutoff process to subsequent start of the fuel cutoff process lengthens, and
a change process for making the first predetermined value smaller when the second index value is small in starting the fuel cutoff process than when the second index value is large in starting the fuel cutoff process.

2. The control apparatus for the internal combustion engine according to claim 1 that makes the first predetermined value smaller in the subsequent fuel cutoff process when the first index value acquired upon end of the fuel cutoff process is large than when the first index value is small, in the change process.

3. The control apparatus for the internal combustion engine according to claim 1 that determines whether or not the second index value is smaller than a second predetermined value determined in advance in starting the fuel cutoff process, that makes the first predetermined value smaller when it is determined that the second index value is smaller than the second predetermined value than when the second index value is equal to or larger than the second predetermined value, and that makes the second predetermined value larger in the subsequent fuel cutoff process when the first index value acquired upon end of the fuel cutoff process is large than when the first index value is small, in the change process.

4. The control apparatus for the internal combustion engine according to claim 1, wherein
the internal combustion engine is equipped with a plurality of cylinders identical to the cylinder, and a plurality of fuel injection valves identical to the fuel injection valve and provided for the cylinders respectively, and
the fuel cutoff process includes a specific cylinder fuel cutoff process for stopping supply of fuel to one or some of the cylinders while supplying fuel to the other cylinders or the other cylinder, and an all-cylinder fuel cutoff process for stopping supply of fuel to all of the cylinders,
the control apparatus making the first predetermined value smaller when the last fuel cutoff process is the all-cylinder fuel cutoff process than when the last fuel cutoff process is the specific cylinder fuel cutoff process, in the change process.

5. The control apparatus for the internal combustion engine according to claim 1, wherein
the internal combustion engine is equipped with a plurality of cylinders identical to the cylinder, and a plurality of fuel injection valves identical to the fuel injection valve and provided for the cylinders respectively, and
the fuel cutoff process includes a specific cylinder fuel cutoff process for stopping supply of fuel to one or some of the cylinders while supplying fuel to the other cylinders or the other cylinder, and an all-cylinder fuel cutoff process for stopping supply of fuel to all of the cylinders,
the control apparatus determining whether or not the second index value is smaller than a second predetermined value determined in advance in starting the fuel cutoff process, making the first predetermined value smaller when it is determined that the second index value is smaller than the second predetermined value than when the second index value is equal to or larger than the second predetermined value, and making the second predetermined value larger when the last fuel cutoff process is the all-cylinder fuel cutoff process than when the last fuel cutoff process is the specific cylinder fuel cutoff process, in the change process.

6. The control apparatus for the internal combustion engine according to claim 1, wherein
the second index value is an integrated value of an amount of intake air from end of the fuel cutoff process to subsequent start of the fuel cutoff process.

7. The control apparatus for the internal combustion engine according to claim 1 that uses the first predetermined value that remains unchanged regardless of the second index value, when the last fuel cutoff process is ended due to non-fulfillment of the fuel cutoff condition.

8. A control apparatus applied to an internal combustion engine equipped with a cylinder for burning fuel, a fuel injection valve for supplying fuel into the cylinder, an exhaust passage connected to the cylinder, and a filter located in the exhaust passage to collect particulate matter contained in exhaust gas, the control apparatus performing
a fuel cutoff process for stopping supply of fuel to the cylinder from the fuel injection valve when a fuel cutoff condition determined in advance is fulfilled,
a first acquisition process for acquiring a first index value that increases as an integrated amount of intake air during performance of the fuel cutoff process increases,
a cancellation process for cancelling the fuel cutoff process when the first index value becomes equal to or larger than a first predetermined value determined in advance, during performance of the fuel cutoff process, and
a second acquisition process for acquiring a second index value that increases as an elapsed time from end of the fuel cutoff process to subsequent start of the fuel cutoff process lengthens, and
the control apparatus making a speed of increase in the first index value with respect to the integrated amount of intake air higher when the second index value is small in starting the fuel cutoff process than when the second index value is large in starting the fuel cutoff process, in the first acquisition process.

* * * * *